United States Patent
Vautrain et al.

[15] 3,691,728
[45] Sept. 19, 1972

[54] REGENERATION PROCESS FOR SOLID DESICCANTS

[72] Inventors: Lucien H. Vautrain; Russell W. Lortz, both of Sweeny, Tex.

[73] Assignee: Phillips Petroleum Company

[22] Filed: Oct. 29, 1969

[21] Appl. No.: 872,198

[52] U.S. Cl....................................................55/33
[51] Int. Cl. .............................................B01d 53/02
[58] Field of Search............55/33, 58, 62, 63, 74, 75; 260/94.7, 683

[56] References Cited

UNITED STATES PATENTS

| | | | |
|---|---|---|---|
| 3,106,593 | 10/1963 | Benesi et al. | 55/75 X |
| 3,226,913 | 1/1966 | Avery | 55/75 X |
| 3,242,641 | 3/1966 | Makin, Jr. | 55/33 |
| 3,304,693 | 2/1967 | Ebrey | 55/74 X |
| 3,352,840 | 11/1967 | Oktay | 260/94.7 |

Primary Examiner—Reuben Friedman
Assistant Examiner—R. W. Burks
Attorney—Young and Quigg

[57] ABSTRACT

A solid desiccant, used to dehydrate a gas, e.g., an ethylene-containing gas resulting from the pyrolytic conversion of a saturated hydrocarbon such as ethane or propane, is washed of deposited or polymeric material by passing a solvent, for example, an aromatic solvent such as benzene, toluene, or xylene, into the same, draining the solvent from the desiccant and reducing the pressure on the desiccant to cause evaporation of solvent which is removed whereupon the desiccant is heated to regenerate the same. In a modification a gas, e.g., a fuel gas, is passed through the bed, wet with solvent, to agitate the solvent in the bed to aid in the removal of the deposit or polymer therefrom. The desiccant can be an alumina or molecular sieve or other known desiccant which can be used to dehydrate any known vapor or gas which tends to form deposits or polymers which can be removed with a solvent following a dehydrating cycle.

10 Claims, 1 Drawing Figure

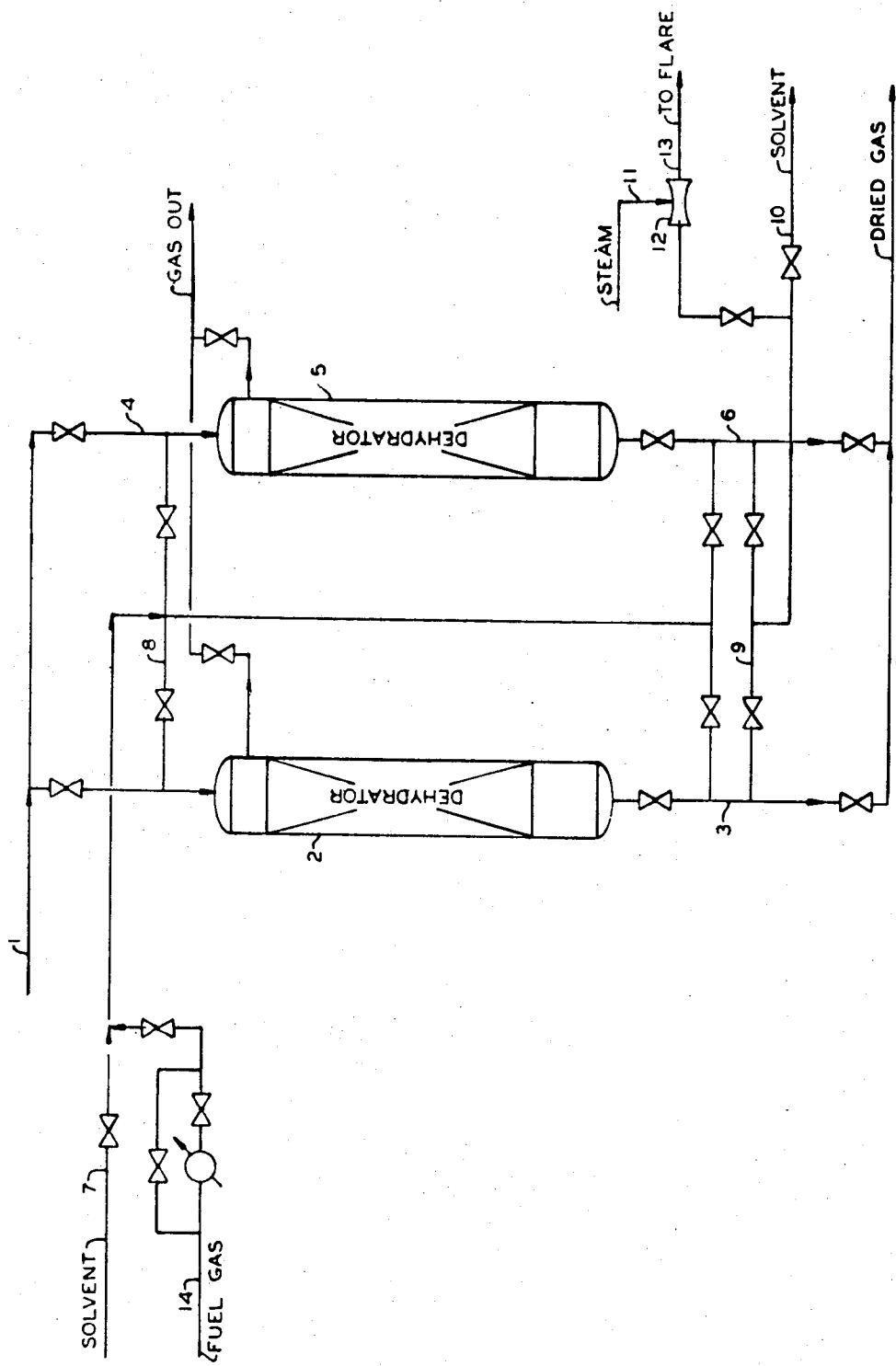

REGENERATION PROCESS FOR SOLID DESICCANTS

In one of its aspects this invention relates to a method for the regeneration of a solid desiccant. In another of its aspects the invention relates to the removal of a deposit or polymer from a solid desiccant.

In one of its concepts the invention provides a method for the operation of a dehydration zone comprising a bed of desiccant which tends to become filled with a deposit of material while being used to dehydrate a gas being passed therethrough which comprises arresting the flow of gas being dehydrated, passing a solvent for the deposited material into said bed and later reducing the pressure in said zone to cause evaporation of the solvent, following which the desiccant is regenerated by passing a hot regeneration gas therethrough. In another of its concepts the invention provides a method as described wherein while the desiccant contains at least a portion of the solvent, a gas is passed therethrough to agitate and to, therefore, aid said solvent in diluting or loosening the said deposit. In a further concept of the invention, it provides a method as described wherein the desiccant bed is substantially drained of solvent following which the pressure is reduced to aid in removing deposited material together with residual solvent from the bed.

Although the invention has wide applicability as one skilled in the art in possession of this disclosure can readily realize, it will now be described in connection with an application to the removal of polymeric deposits from desiccants such as alumina and molecular sieve used to dehydrate an ethylene-containing gas derived from a pyrolytic conversion of a saturated hydrocarbon such as ethane and propane and, therefore, containing polymer-forming constituents such as butene and butadiene.

A serious limitation to unit capacity and, therefore, an economic liability on a unit used to dehydrate gases and, therefore, on the entire operation from which the gas is a result has been the deposition of materials such as polymers or polymeric substances on the desiccant. This greatly reduces the life and efficiency of the desiccant.

Despite repeated regeneration, it appears that the polymeric material remains in the desiccant. Indeed, this polymeric material hardens on the desiccant, rather quickly reducing its efficiency as well as its life cycle. It appears that the hardening takes place primarily during regeneration of the desiccant, very likely due to the heating of the deposit during the regeneration by the hot gases ordinarily used.

It has now been conceived that the hardening of the deposited material or polymeric material can be considerably avoided if not all together eliminated by periodically washing the desiccant with a solvent before the bed is heated so that the polymeric material is removed and cannot coat the desiccant particles or pellets with a hardened polymer, as herein discussed. Upon draining of solvent from the bed of desiccant, residual solvent is vaporized quickly by reducing pressure, whereupon the conventional heating with regeneration gas can take place.

Further, it has been conceived that while the bed of desiccant is filled with solvent the solvent therein can be agitated to aid in loosening deposited material or polymeric material by passing a gas through the desiccant bed at a velocity sufficient to cause adequate agitation.

It is an object of this invention to dehydrate a gas, It is a further object of this invention to regenerate a desiccant bed. It is another object of this invention to avoid the formation of hardened deposits in a desiccant bed. A still further object of the invention is to provide a method for so treating a bed of desiccant used to dehydrate an ethylene-containing gas resulting from a pyrolytic conversion of a saturated hydrocarbon such as ethane or propane that deposited polymer-forming materials will be removed before polymer can be substantially formed and hardened in said bed, as during regeneration.

Other aspects, concepts and objects of the invention as well as its several advantages are apparent from a study of this disclosure, the drawing and the appended claims.

According to the present invention a desiccant bed which has been used to dehydrate a gas and which has deposited thereon a material which may tend to harden during regeneration is treated with a solvent for said material, whereupon the pressure is reduced on the bed to cause evaporation of the solvent. Also, according to the invention while solvent is still within the bed, it can be agitated by passing a gas through the bed in a manner to cause desired agitation.

The invention is particularly applicable to gases which tend to deposit polymer-forming materials which tend to form polymers when heated.

The invention is applicable to the treatment and regeneration of dryers or desiccant beds used in ethylene gas production.

The following is a typical analysis of an ethane-containing gas fed to a cracking operation in which the ethane is cracked to produce an ethylene-containing gas:

| | |
|---|---|
| Hydrogen | 0.0 |
| Methane | 1.900 |
| Ethylene | 0.0 |
| Ethane | 96.500 |
| Acetylene | 0.0 |
| Propylene | 1.300 |
| Propane | 0.300 |
| Butene | 0.0 |
| Butadiene | 0.0 |
| N-butane | 0.0 |
| Sum | 100.000 |

The conditions under which a feed such as just given is cracked to produce ethylene do not form a part of this invention. These conditions are well known and usually include a temperature of approximately 1,500° or so F. and a time at this temperature such that the desired conversion takes place. Upon conversion the conversion effluent is ordinarily quenched, compressed, subjected to knock-out drum operation and caustic washed, following which there follows the dehydrating operation with which this invention is concerned.

Upon conversion a feed as above given produces an effluent having an analysis which may be substantially as follows:

| | |
|---|---|
| Carbon Monoxide | 0.29 |
| Carbon Dioxide | 0.00 |
| Hydrogen | 28.83 |
| Methane | 10.38 |
| Acetylene | 0.28 |
| Ethylene | 34.34 |

| | |
|---|---|
| Ethane | 24.38 |
| Propylene | 0.65 |
| Propane | 0.23 |
| Butadienes | 0.23 |
| Butylenes | 0.23 |
| C₅+ & Oils | 0.16 |
| Sum | 100.00 |

It can be seen from the analysis just given that there are contained in the stream butylenes, butadiene and oils which may contribute to the formation of polymers which may harden on the desiccant.

Referring now to the drawing there are shown two dehydrators, in this instance filled with alumina and molecular sieve. A treated ethylene-containing gas, treated substantially as herein described and having produced as herein described and is known in the art, is passed by 1 into dryer 2 and from the dryer by 3 to ethylene purification. After a number of hours of use dehydrator 2 is taken from the system and during this time the ethylene gas is caused to pass by 4 into dehydrator 5 and from dehydrator 5 and 6 and 3 to ethylene purification and recovery.

While dehydrator 5 is operating to treat the ethylene-containing gas, dehydrator 2 is treated as follows. Aromatic solvent, e.g., benzene, is passed by valve pipe 7 and valve pipe 8 into pipe 1 and thence into dryer 2. The dryer is filled with the solvent which is allowed to remain in the dryer for a time sufficient to at least attack the deposited materials. Thereupon dryer 2 is drained of solvent, removed by pipe 9 and by pipe 10 to solvent recovery. Following removal of the drained solvent, steam is passed by pipe 11 into vacuum eductor 12 and a suction drawn on dryer 2 by pipes 10 and 9 by way of pipe 13, thus removing residual solvent and additional polymer-forming material from dryer 2.

As an important feature of the invention, while dryer 2 still contains some solvent, a gas such as a fuel gas, as available in the oil refinery is passed therethrough entering at 14 into pipe 7 and from there by 8 into pipe 1 and dryer 2. This gas rushes through the desiccant bed and is passed by 3, 9, 10, and 13 to a gas flare.

It is within the scope of the invention to pass the fuel gas upwardly through the desiccant bed while it still contains some solvent but this mode of operation is not now preferred since it is helpful to have the aid of gravity when blowing out the bed to free it from polymeric materials or polymer-forming materials.

Only one cycle of the operation has been described in connection with the drawing. Obviously, while dryer 2 is on a drying cycle, dryer 5 can be treated as just described for dryer 2.

In a typical operation according to the flow plan of the drawing, the dryers are filled with an upper bed of 150 cu. ft. of activated alumina (Kaiser KA-201) and a lower bed of 945 cu. ft. of molecular sieve material (Linde 3A) of desiccant quality. About 72.8 million standard cubic feet per day of ethylene gas is dehydrated at 50° F. and 188 psig. Onstream time for these dryers is about 15 hours depending on polymeric conditions. Shut-down time is about 10 hours. Approximately 150 bbl. of benzene solvent are pumped into and allowed to stand in each of the dryers at each shut-down. The standing time for the solvent in the dryers is in the neighborhood of 12 hours. Thereafter, the dryers are opened to be drained and in the further embodiment of the invention the fuel gas is piped in and through the dryer. The vacuum eductor 12 can be made operative not only during the time that the bulk of residual solvent and polymer or polymer-forming materials is being removed from the desiccant bed, but also during the time that the fuel gas is being fed to the drying zones. This gives a push-pull operation causing the gas to rush through the desiccant bed more forcefully as one skilled in the art will understand.

Prior to application of this invention to the operation of dehydrating ethylene as herein described, the described dryers could be maintained onstream for drying for only a total of 12 hours. After application of the invention this time was increased to 18 hours, i.e., an increase of 50 percent. The efficiency of the dryers calculated as average efficiency over the time cycle of use prior to need for regeneration was 50 percent as against 80 percent after application of the invention. Thus, it is seen that the invention has permitted not only a substantial increase in efficiency, but has permitted this efficiency to be obtained over a considerably longer period of time.

Other gases which can be treated according to the invention to dehydrate the same include propylene, butylene, pentenes and even vapors of higher molecular weight hydrocarbons.

The invention can be applied to clean out deposits of a general character, i.e., not necessarily of a polymeric character as may be obtained by treating gases which do not form polymers, for example, saturated gases.

The solvents which have been set forth for disclosure purposes are primarily those of an aromatic character, e.g., benzene, toluene, xylenes or heavy reformed naphtha (Platformate). Cracked gasolines containing aromatic compounds can also be used as solvents. Other solvents, depending upon the nature of the deposit to be treated, can be selected by mere routine test.

Reasonable variation and modification are possible within the scope of the foregoing disclosure, the drawing and the appended claims to the invention the essence of which is that there has been provided a method for removing deposits of polymeric materials from desiccant beds in a dehydration zone by filling said zone with solvent, removing the solvent, drawing a vacuum on the zone to remove residual solvent and residual polymeric material and in one embodiment passing a fuel gas through said zone while it contains some solvent to agitate the solvent and to aid in removal of the polymeric or other deposited material.

We claim:

1. A method for the operation of a dehydration zone comprising a bed of desiccant which tends to become fouled with a deposit of material while being used to dehydrate a gas being passed therethrough which comprises arresting the flow of gases being dehydrated, passing into said bed a solvent for said material, reducing the pressure in said zone to cause evaporation of said solvent and then passing hot regeneration gas through said zone.

2. A method according to claim 1 wherein there is passed through the bed in said zone, while it contains said solvent, a gas to agitate and, therefore, aid said solvent in diluting or loosening said deposit and, therefore, to better wash said bed of desiccant.

3. A method according to claim 1 wherein the solvent is drained from said bed prior to reducing the pressure.

4. A method according to claim 2 wherein the gas is passed through the bed prior to draining the solvent completely therefrom.

5. A method according to claim 1 wherein the gas is an unsaturated hydrocarbon and the deposit is a polymeric material formed therefrom.

6. A method according to claim 5 wherein the gas is an ethylene-containing gas derived from the pyrolytic conversion of a saturated hydrocarbon such as ethane or propane.

7. A method according to claim 1 wherein the desiccant is one of an alumina or a molecular sieve.

8. A method according to claim 1 wherein the solvent is passed downwardly through the bed of desiccant and wherein the solvent is drained from the bed, whereupon the pressure is reduced, the direction of flow remaining unchanged, so that the vapors of solvent forming due to reduction of pressure also pass downwardly from the bed, thus further aiding in the sweeping of the deposited material from the bed.

9. A method according to claim 1 wherein the introduced solvent which is in said bed is agitated by passing a gas through said bed, the bed is drained and the pressure then reduced, the gas being dehydrated is an ethylene-containing gas resulting from a pyrolytic conversion of a saturated hydrocarbon such as ethane or propane and the deposit is a polymeric material formed from said ethylene-containing gas.

10. A method according to claim 9 wherein the solvent is an aromatic solvent.

* * * * *